J. Armstrong,
Steam-Boiler Condenser.

Nº 81,971. Patented Sep. 8, 1868.

Witnesses:
G. H. Smith
J. G. Theaker

J. Armstrong, Inventor.
By J. G. Theaker
his attorney.

UNITED STATES PATENT OFFICE.

JAMES ARMSTRONG, OF BUCYRUS, OHIO.

IMPROVEMENT IN FEED-WATER HEATER AND FILTER.

Specification forming part of Letters Patent No. 81,971, dated September 8, 1868.

*To all whom it may concern:*

Be it known that I, JAMES ARMSTRONG, of Bucyrus, in the county of Crawford and State of Ohio, have invented a new and useful Improvement in Heater and Filter for Heating, Purifying, and Filtering Water; and I do hereby declare that the following is a full, clear, and exact description thereof, reference being had to the accompanying drawings, in which—

Figure 1:
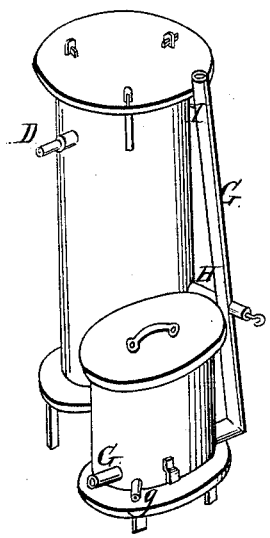
Figure 2:
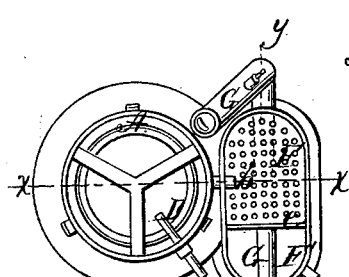
Figure 3:
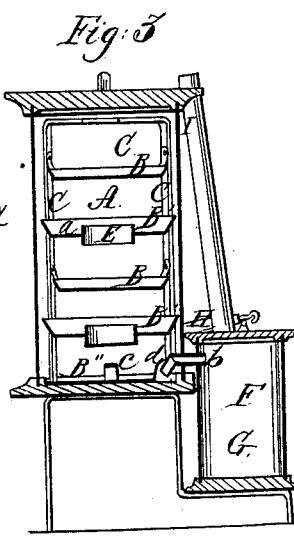
Figure 4:
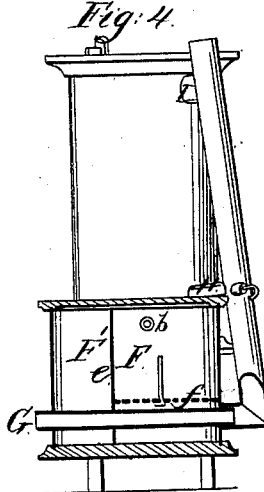

Figure 1 is a perspective view. Fig. 2 is a plan view, with the top of the cylinder removed. Fig. 3 is a vertical section taken in the line $x\,x$ of Fig. 2, and Fig. 4 is a vertical section taken in the line $y\,y$ of Fig. 2.

The nature of my invention consists in an arrangement for filtering and heating water by the use of waste-steam from boilers.

To enable others skilled in the art to make and use my invention, I will proceed to describe its construction and operation.

A represents a chamber, in which are pans B B. These pans are secured to a frame, C, which rests upon the bottom of the chamber A. In the side of the chamber A is a pipe, D, which enters above, and discharges the water into the upper pan. Any desired number of pans may be used, but should be arranged as shown in Fig. 2, the diameter of the upper one being smaller than the next one below it, the larger one having an opening, E, in the center, around the edge of which is a flange, $a$. On the bottom of the chamber A is a disk, B, on which is a handle, $c$, by which it can be removed. Between the chambers A and F is a pipe, $b$, the end inside of the chamber A being above the disk B, which has an opening in one side of it. Around this opening is a flange, $d$, and the end of the pipe $b$ is inside of this flange. F represents the chamber into which the water is discharged from the chamber A through the pipe $b$. Near the bottom of the chamber F is a steam-pipe, G, which passes through it, as seen in Fig. 4.

The chamber F is divided by a partition, $e$, the lower part of which is perforated. In this chamber there is also another perforated partition, $f$, which is placed above the steam-pipe G. This steam-pipe extends up outside, and has two entrances to the chamber A. In the lower one, H, is a gage, by which the quantity of steam entering the chamber A can be regulated. Near the bottom of the chamber F' is the discharge-pipe $g$, through which the water escapes to the boiler.

Its operation is as follows: The water enters through the pipe D, fills the upper pan, and when this is full it runs over the edge into the next one below it, which in turn is filled up to the top of the flange $a$, and the water then runs over the edge of that into the pan below, and so on throughout the entire series of pans. At the same time the steam is let into the chamber, and, by contact with the water, heats it, and causes the lime and other impurities in the water to be deposited in the bottom of the pans. When a sufficient quantity of water has passed through the pans to fill up the bottom of the chamber to the top of the flange $d$ of the disk B'', it runs over the side of $d$ into the pipe $b$, and through it into the chamber F, and is then filtered through the filter $f$ over the steam-pipe G, thence into the chamber F' through the perforated partition $e$, and it passes from it into the boiler through the pipe $g$, by which process it has been relieved of its impurities. The steam-pipe G, which passes through the chambers F F', also heats the water in said chambers.

Having thus fully described my invention, what I claim, and desire to secure by Letters Patent, is—

1. The pans B B', when constructed and arranged substantially in the manner shown and described.

2. The combination of the steam-pipe G, chambers F and F', substantially in the manner shown and described.

3. The chambers F F' and the filters $e$ and $f$, when constructed substantially in the manner shown and described.

4. The arrangement of the pans B B' and the disk B'', substantially in the manner described.

JAMES ARMSTRONG.

Witnesses:
J. G. THEAKER,
G. A. C. SMITH.